July 5, 1938.   J. M. GANTVOORT   2,122,397
BAKER'S OVEN
Filed July 23, 1936
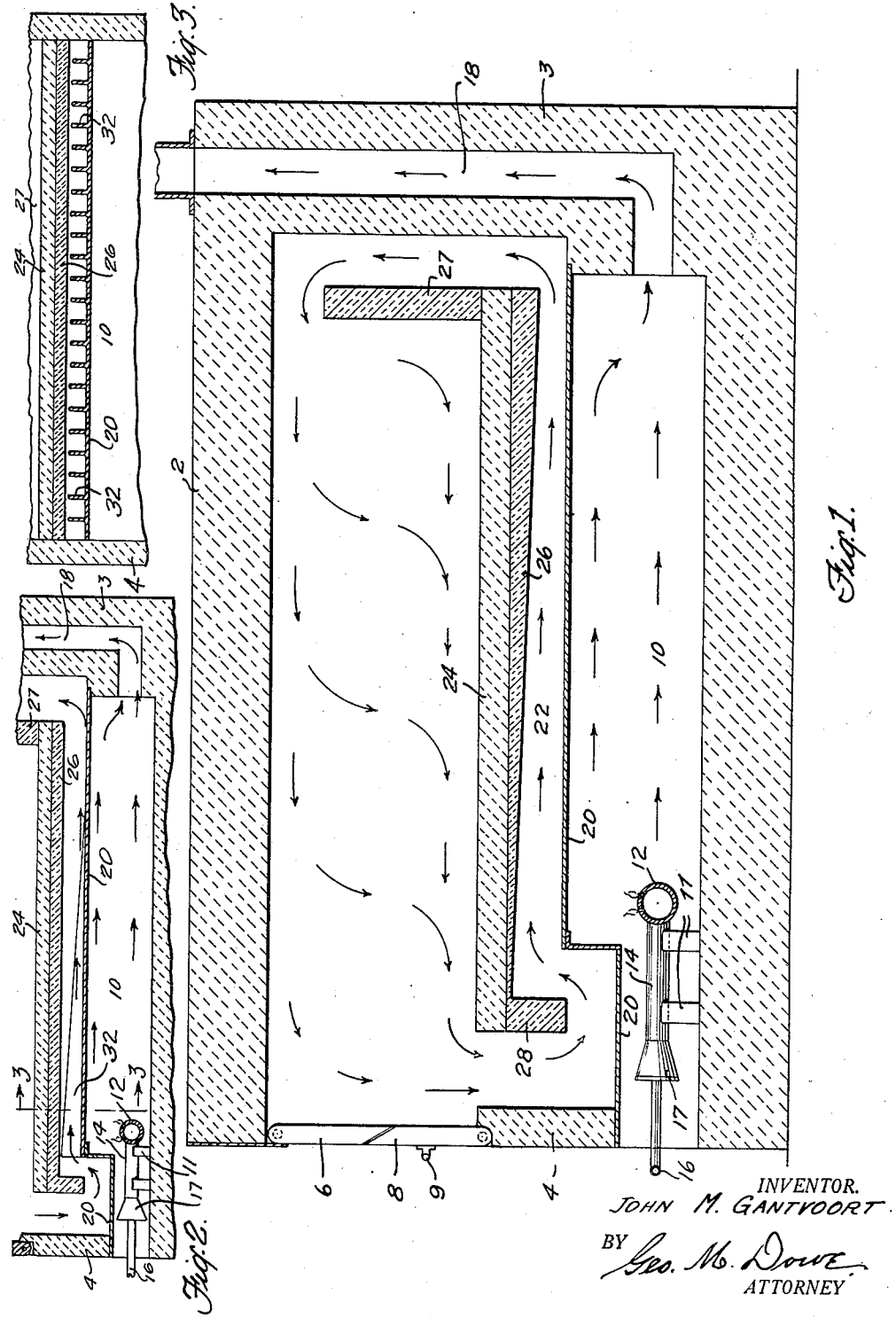
INVENTOR.
JOHN M. GANTVOORT
BY Geo. M. Dowe
ATTORNEY Patented July 5, 1938

2,122,397

UNITED STATES PATENT OFFICE 2,122,397

BAKER'S OVEN

John M. Gantvoort, Bronxville Manor, Westchester County, N. Y., assignor to Hilde Gantvoort Application July 23, 1936, Serial No. 92,068

5 Claims. (Cl. 107—55)

This invention relates to a baker's oven of that type wherein the bottom heat is applied to the materials to be baked through contact with a hearth and the top heat is supplied by convection currents.

More particularly the oven of the present invention is provided with a heat chamber beneath the baking hearth, the source of heat being located at the front of the oven and under the heat chamber. The heated air flows along the heat chamber and enters the oven near the top thereof and the top baking is effected by the downwardly moving convection currents which becoming somewhat cooled, flow back into the heat chamber at the forward end thereof and are reheated during their passage therethrough. With such a system of convection heating the desired temperature of the baking chamber may be maintained. Since, however, the baking is effected largely through the application of bottom heat, the baking hearth should be maintained at a substantially constant temperature throughout and this temperature must be sufficiently high for proper bottom baking but somewhat lower than the temperature of the baking chamber in order that the downward flow of the convection currents in the baking chamber may not be interfered with.

An important feature of the present invention therefore, resides in the provision of means in an oven of the type above defined whereby the temperature of the baking hearth is maintained substantially constant throughout notwithstanding the cooling effect of the gases passing from the oven to the heat chamber.

The invention will be better understood by reference to the following more detailed description and claims when taken in connection with the accompanying drawing in which:

Figure 1 is a section through an oven having my improvements applied thereto.

Figure 2 is a sectional view of the lower portion of the oven structure showing a modification of the invention; and Figure 3 is a section on the line 3—3 of Figure 2.

Referring to Figure 1 the oven is constructed of suitably insulated top and bottom walls 2, an end wall 3 and a front wall 4 having an opening therein which is closed by an oven door transversely divided into an upper section 6 and a lower section 8 and having a handle 9 by which access to the oven is had. Above the lower wall of the oven is a compartment or fire box 10 wherein is located the heating means. For this purpose brackets 11 support a series of burners 12 extending transversely of the fire box and having the usual mixing chamber 14 to which gas is supplied from a pipe 16 and air is supplied through the usual adjustable cap 17. The products of combustion pass through the chamber 10 and up a chimney 18 formed in the rear oven wall.

Above the box 10 and separated therefrom by a metal partition 20 is a heat chamber 22 the height of which is limited by a baking hearth 24 and its insulation 26. The height of the chamber 22 is greatly restricted in proportion to its length so as to form a relatively narrow passage through which the heated gases pass.

The baking hearth is composed of ceramic material such as tile and extends from front to rear of the oven for such a distance only as to leave a passageway at the front and the rear for permitting the gases to pass from the heat chamber to the baking chamber of the oven at the rear and from the baking chamber back to the heat chamber at the front. A vertical partition 27 of insulating or non-heat conducting material extends from the rear end of the hearth to a point near the top of the oven and constitutes a heat barrier at the rear of the oven. A similar partition 28 extends downwardly from the front end of the hearth 24 and this is also made of insulating or non-heat conducting material.

With the construction so far described it will be apparent that as the plate 20 is heated by the burners placed under it the air in the heat chamber 22 will begin to flow along underneath the hearth 24 following the course of the arrows shown in Figure 1 and the heated air will pass over the top of the barrier 27 and enter the baking chamber 30 near the top. As the air is cooled it will flow downwardly and under the barrier 28 and back into the heat chamber to be reheated. The barrier 28 prevents counter flow of the air.

It is desirable for good baking that the baking chamber shall be maintained at the desired temperature and that the top heat for baking be supplied by descending convection currents in the baking chamber. To effect this result it is necessary that the hearth be maintained at a temperature lower than that of the baking chamber. Since it is desirable to thermostatically control the oven temperature the thickness of the ceramic material composing the hearth becomes a factor. The thinner this material, the better the thermostatic control. On the other hand there must be sufficient ceramic material to provide the heat capacity necessary for proper baking. It is has been found that 1¼" tile is sufficient for any goods to be baked. However, with ceramic material of this thickness it is not possible to maintain the temperature difference between the hearth and the oven necessary for the proper convection circulation and at the same time maintain the temperature of the oven gases at the temperature necessary for baking. Therefore it is necessary to insulate the hearth in order that these results may be obtained. It will be understood of course that the thicker the insulation under the hearth the higher the temperature of the air which will enter the baking chamber, due to the fact that the air passing under the hearth through the heating chamber will not lose so much of its heat to the hearth and therefore this air will enter the baking chamber at a higher temperature. The amount of insulation found practical for this purpose is about 1¼ inches.

However, if the insulation under the hearth is of uniform thickness throughout, I found as a matter of practical experience that the cooled air descending from the baking chamber and entering the heat chamber passes through said chamber with such velocity that the front end of the hearth is cooler than the rear end unless special means are provided to prevent this in spite of the fact that the source of heat is located at the front of the hearth.

My invention therefore in its broad aspect consists in providing means whereby the heat source may supply a relatively greater amount of heat to the hearth near the front thereof to compensate for this cooling effect of the air entering the heat chamber.

In the preferred form of my invention, shown in Figure 1, I accomplish this result by making the insulation 28 the maximum thickness at the rear and having it gradually diminish in thickness towards the front of the hearth. By thus varying the thickness of the insulation in a ratio depending upon the cooling effect of the gases entering the heat chamber, I am enabled to obtain a uniform temperature throughout the hearth while at the same time maintaining the proper temperature relation between the hearth and the gases entering the baking chamber from the heat chamber.

While the form of the invention shown in Figure 1 is the preferred one, nevertheless the same result may be accomplished in other ways. For instance in the form of the invention shown in Figure 2, the insulation 26 may be of uniform thickness but I provide the plate 20 with a series of fins 32 which fins are longest at the front end of the plate 20 just above the source of heat, and gradually taper as they extend rearwardly. Said fins act to transfer heat to the hearth with greater rapidity at the forward end thereof and thereby properly compensate for the cooling effect of the gases descending from the baking chamber and entering the heat chamber.

It may be desirable with ovens of different dimensions to use both fins and tapered insulation and when this combination is used the fins may be made shorter. There is some advantage in having the fins shorter since then they do not retard to so great a degree, the velocity of the gases passing through the heat chamber and it is an advantage to have a rapid flow. A rapid flow, as will be obvious, makes for rapid heat transfer, which in turn permits the use of a smaller heater with less fuel consumption.

What I claim is:

1. A baking oven wherein the bottom heat for the materials to be baked is applied through contact with a hearth and the top heat is supplied through the downward circulation of convection currents, a heating chamber of restricted height under the hearth baffling means to cause the air currents to enter said chamber on leaving the baking chamber at the front thereof, and through which they flow to be heated, heating means at the front of the heat chamber and means for causing the heating means to supply gradually diminishing quantities of heat to the hearth with the greatest quantity supplied near the front thereof to compensate for the cooling effect of the air currents entering the heat chamber to thereby maintain the hearth at the same temperature throughout.

2. A baking oven wherein the bottom heat for the materials to be baked is applied through contact with a hearth and the top heat is supplied through the downward circulation of convection currents, a heating chamber of restricted height under the hearth baffling means to cause the air currents to enter said chamber on leaving the baking chamber at the front thereof and through which they flow to be heated, heating means at the front of the heat chamber, insulation extending under the hearth, said insulation being of greatest thickness at the rear thereof and gradually diminishing towards the front whereby the greatest quantity of heat is supplied to the hearth near the front thereof to maintain the hearth at substantially uniform temperature throughout notwithstanding the cooling effect of the descending currents of air from the baking chamber as they enter the heat chamber.

3. A baking oven wherein the bottom heat for the materials to be baked is applied through contact with a hearth and the top heat is supplied through the downward circulation of convection currents, a heating chamber of restricted height under the hearth baffling means to cause the air currents to enter said chamber on leaving the baking chamber at the front thereof and through which they flow to be heated, heating means at the front of the heat chamber, insulation beneath said hearth and a series of fins extending into the heat chamber towards said hearth, said fins having their largest heating surface at the front thereof.

4. A baking oven wherein the bottom heat for the materials to be baked is applied through contact with a hearth and the top heat is supplied through the downward circulation of convection currents, a heating chamber of restricted height under the hearth baffling means to cause the air currents to enter said chamber on leaving the baking chamber at the front thereof and through which they flow to be heated, heating means at the front of the heat chamber, insulation beneath said hearth and a series of fins extending into the heat chamber towards said hearth, said fins being nearer the hearth at the front end thereof and becoming gradually shorter towards the rear of the hearth.

5. A baking oven wherein the bottom heat for the materials to be baked is applied through contact with a hearth and the top heat is supplied through the downward circulation of convection currents, a heating chamber of restricted height under the hearth baffling means to cause the air currents to enter said chamber on leaving the baking chamber at the front thereof and through which they flow to be heated, heating means at the front of the heat chamber, insulation extending under the hearth, said insulation being of greatest thickness at the rear thereof and diminishing in thickness towards the front, and a series of fins extending into the heat chamber towards said hearth, said fins having their largest heating surface at the front end thereof.

JOHN M. GANTVOORT.